United States Patent [19]

Knight

[11] 4,314,953

[45] Feb. 9, 1982

[54] PROCESS FOR REDUCING FRIABILITY OF DETERGENT POWDERS

[75] Inventor: Peter C. Knight, South Wirral, England

[73] Assignee: Lever Brothers Company, New York, N.Y.

[21] Appl. No.: 159,030

[22] Filed: Jun. 13, 1980

[51] Int. Cl.$^3$ .......... B01J 2/02

[52] U.S. Cl. .......... 264/13

[58] Field of Search .......... 264/13

[56] References Cited

U.S. PATENT DOCUMENTS 3,347,798 10/1967 Baer et al. .......... 264/13

3,803,285 4/1974 Jensen .......... 264/143

*Primary Examiner*—James R. Hall

[57] ABSTRACT

The friability of spray-dried detergent powder containing a relatively high level of anionic surfactant and a relatively low level of inorganic material is reduced by the use of hydrated starch. The preferred amount of hydrated starch is from 1 to 5% and the invention is particularly applicable to powders containing 5% or more of sodium silicate, 20–30% by weight of detergent active compound and an amount of phosphate builder compound of less than about 7% by weight of the spray-dried powder, calculated as phosphorus.

2 Claims, No Drawings

PROCESS FOR REDUCING FRIABILITY OF DETERGENT POWDERS

The invention relates to detergent powders and to processes for making them.

One of the problems encountered when manufacturing detergent powders by a spray-drying process is that friable powders can be produced. Housewives generally have become accustomed to measure detergent powders by volume rather then weight and, consequently, it is commercially desirable to produce a powder having a bulk density in the correct range. If the powder which results from a process is friable, it is necessary for its initial bulk density to be low, otherwise by the time it arrives at its destination beside the washing machine it has become too dense. However, it is very difficult technically and also very uneconomic to spray-dry powders to low bulk densities.

It would be much more effective if the friability of the powder could be reduced, and we have now discovered how this can be done.

According to the present invention there is provided a process which comprises forming an aqueous crutcher slurry comprising a detergent active compound, a detergencybuilder compound and hydrated starch, and spray-drying it to form a detergent powder having reduced friability.

In a second aspect of the invention there is provided a spray-dried detergent powder having reduced friability comprising a detergent active compound, a detergency builder compound and hydrated starch.

That starch has been found to be useful for use in a powder is surprising, in view of the statement in U.S. Pat. No. 3,803,285 that starches are not generally suitable for use in granular detergent compositions.

However, we have discovered and demonstrate hereafter that starch is ineffective for reducing detergent powder friability unless it is incorporated into the aqueous crutcher slurry in such a way that it has sufficient time to hydrate, at least partially. The simplest way of achieving this is to add the starch at an early stage in the formation of the slurry, usually before the inorganic salts are added. For example, an aqueous crutcher slurry can be formed by mixing components in the following order: water, alkaline sodium silicate solution, detergent-active paste(s), sodium tripolyphosphate, sodium sulphate, sodium carboxymethyl cellulose, sodium toluene sulphonate and minor components. If the starch is dispersed in the alkaline sodium silicate solution and added to the water in the crutcher slurry it has adequate opportunity to hydrate and is effective in reducing powder friability. If, on the other hand, it is mixed with the sodium sulphate and added to the partly-formed slurry, there is such a high concentration of inorganic materials present that the starch is unable to hydrate and is ineffective.

The problem of detergent powder friability is particularly severe in cases where little or no phosphate is present in the formulation, since it appears that phosphates contribute in some way to the physical structure of spray-dried powders. In a preferred aspect, the invention therefore relates to a process and composition in which the amount of phosphate, measured as phosphorus, is less than 7%, preferably from 2–4% by weight of the spray-dried powder.

Furthermore, the problem of friability is marked in powders containing a relatively high level of detergent active compound, so a preferred feature of the processes and compositions of the invention is that they relate to powders containing from 10–35%, more preferably 20–30% by weight of the detergent active compound.

The starch may be derived from any suitable source such as potatoes, arrowroot, tapioca, cassava, sago or corn (maize). The production of starch from these sources and the general physical and chemical properties of starch are described in Vol. 18 of the "Encyclopedia of Chemical Technology", pages 673 to 689 by Kirk Othmer (John Wiley & Sons, New York, 1969).

The amount of starch required to effect a satisfactory reduction in friability in spray-dried powders in accordance with the invention will be from about 1 to about 5% by weight of the spray-dried powder.

The particle size of the starch affects the ease with which it can be incorporated into a crutcher slurry, the finer the particles, the more difficult the dispersion. Where very fine particles are involved, it will certainly be necessary to pre-disperse the starch before incorporating it in the crutcher slurry.

The detergent-active component may be anionic, nonionic, zwitterionic or, exceptionally, cationic in nature.

Examples of suitable anionic detergents are $C_{10-22}$ alkyl benzene sulphonates such as dodecyl benzene sulphonate, $C_{8-24}$ primary alkyl sulphates, preferably $C_{12-20}$ primary alkyl sulphates containing straight chain alkyl groups, $C_{8-24}$ secondary alkyl sulphates, preferably those containing $C_{14-20}$ alkyl groups and a high content of 2- and 3-sulphated isomers, olefine sulphonates, especially those manufactured from vinylidene olefines, and so-called alkyl ether sulphates which are ethoxylated derivatives of primary and secondary alkyl sulphates containing from 1 to 25 moles of ethylene oxide per mole of sulphate.

Preferably, these anionic surfactants are present in the compositions as the sodium salt, although other watersoluble cations can be used.

Examples of suitable nonionic detergents are the ethoxylated and propoxylated derivatives of primary and secondary $C_{8-24}$ alcohols containing from 5–30 moles of ethylene oxide and/or propylene oxide per mole of alcohol, and ethoxylated alkyl phenols such as nonyl phenols. The alcohol derived compounds are preferred because they are believed to be more environmentally and physiologically acceptable than the phenol derived ones. Amongst these, the $C_{12-20}$ primary alcohol ethoxylates containing 5–20 moles of ethylene oxide are preferred. Mixtures of such compounds in ratios providing a desired Hydrophobic-Lipophobic Balance are also very useful.

Suitable zwitterionic compounds are betaines and sulphobetaines and amide oxides, and suitable cationic compounds are tetra alkyl ammonium salts.

These detergent-active compounds, or mixtures of them, can be present in amounts of from $\frac{1}{2}$ to 35% by weight, although as has already been said the invention is particularly applicable to compositions in which the higher amounts of detergent-active compound are present.

The detergency builders which may be used in the process and compositions of this invention may be any of the sequestrant or precipitant builders which have been suggested to replace phosphate builders, or they may be phosphate salts, or mixtures of any one of these, generally in amounts from 10 to 30%, preferably 10 to 20%, by weight in the case of phosphate builders and 10 to 35% by weight in the case of non-phosphate ones.

Examples of detergency builders which may be used are ortho-, pyro- and tripolyphosphates; aluminosilicates; carbonates, especially the sodium carbonate/calcium carbonate combination; polyphosphonates such as ethane-1-hydroxy-1,1-diphosphonate; amine carboxylates such as nitrilotriacetates and ethylene diamine tetra acetates; ether carboxylates such as oxydiacetates, oxydisuccinates, carboxymethyloxysuccinates and malonates; citrates; mellitates; and salts of polymeric carboxylic acids such as polymaleates, polyitaconates and polyacrylates. These salts will normally contain alkali metal or ammonium cations, preferably sodium.

As has already been said, the present invention is particularly applicable to powders in which the amount of phosphate is relatively low.

When the amount of phosphate is low it is necessary for the spray-dried powder to contain 5% by weight or more of sodium silicate, which not only acts as a powder structurant but also as a corrosion inhibitor and pH modifier (see below).

Other conventional components of detergent components may be present in conventional amounts. Examples of these include powder flow aids such as finely divided silicas and aluminosilicates, antiredeposition agents such as sodium carboxymethylcellulose, oxygen-releasing bleaching agents such as sodium perborate and sodium percarbonate, per-acid bleach precursors such as tetraacetylethylenediamine, chlorine-releasing bleaching agents such as trichloroisocyanuric acid and alkali metal salts of dichloroisocyanuric acid, fabric softening agents such as clays of the smectite and illite types, anti-ashing aids, slurry stabilisers such as copolyethylene maleic anhydride and copolyvinylmethylether maleic anhydride, usually in salt form, inorganic salts such as sodium sulphate and, usually present in very minor amounts, fluorescent agents, perfumes, enzymes such as proteases and amylases, germicides and colourants. The detergent compositions usually have an alkaline pH, generally in the region of pH 9–11, which is achieved by the presence of alkaline salts, especially sodium silicates such as the meta-, neutral or alkaline silicates, preferably at levels up to about 15% by weight.

The invention will be further described in the following Examples.

EXAMPLE 1

Four detergent powders were prepared by conventional slurry-making and spray-drying techniques. The formulations were as follows:

| Component | A | B | C | D |
|---|---|---|---|---|
| Sodium dodecyl benzene sulphonate | 22.0 | 22.0 | 22.0 | 22.0 |
| Sodium tripolyphosphate | 14.0 | 14.0 | 14.0 | 14.0 |
| Sodium silicate | 12.0 | 12.0 | 12.0 | 12.0 |
| Sodium toluene sulphonate | 1.9 | 1.9 | 1.9 | 1.9 |
| Potato starch | — | 3.0 | — | — |
| Corn starch | — | — | 3.0 | 3.0 |
| Sodium carboxymethyl cellulose | — | — | 0.87 | — |
| Sodium sulphate and minor components | 43.1 | 43.1 | 40.1 | 40.1 |
| Water | balance to 100 | | | |

The starch in powders B and C was incorporated by dispersing it in sodium silicate solution, which was added to water in the crutcher slurry. The remaining components were then added to this pre-mix.

The starch in powder D was incorporated by admixing it with sodium sulphate and adding the mixture to the remaining components in the form of an aqueous crutcher slurry.

The bulk density of the resultant spray-dried powder was measured. The powder was air-lifted and the measurement repeated. The difference in bulk density is a reflection of the friability of the powder. The results were as follows:

| | Bulk Density ($Kg/m^3$) | | | |
|---|---|---|---|---|
| Powder | As Spray-Dried | After Air-lift | Increase | % Increase |
| A | 254 | 296 | 42 | 16.5 |
| B | 292 | 316 | 24 | 8.2 |
| C | 279 | 312 | 33 | 11.8 |
| D | 268 | 308 | 40 | 14.9 |

It can be seen that the percentage increase in bulk density was greatest in the case of Powder A, which contained no starch. Powders B and C, which are prepared by a process in accordance with the invention exhibited the lowest increases, whereas Powder D, which contained starch but which was prepared in a manner which did not permit hydration, showed very little improvement.

EXAMPLE 2

Two detergent powders were prepared by conventional slurry-making and spray-drying techniques.

| Component | E | F |
|---|---|---|
| Sodium dodecylbenzene sulphonate | 28.0 | 28.0 |
| Sodium tripolyphosphate | 15.0 | 15.0 |
| Sodium silicate | 10.0 | 10.0 |
| Sodium toluene sulphonate | 1.0 | 1.0 |
| Potato starch | 0.0 | 3.0 |
| Sodium carboxymethyl cellulose | 1.0 | |
| | 1.0 | |
| Sodium sulphate and minor components | 35.3 | 32.3 |
| Water | balance to 100 | |

The starch in Powder F was incorporated by dispersing it in a mixture of sodium silicate solution and detergent paste and then adding the resulting dispersion to the remaining components in an aqueous slurry.

The bulk density of the resultant spray-dried powder was measured. The powder was then air-lifted and the measurement repeated. The difference in bulk density is a measure of the friability of the powder. The results were as follows:

| | Bulk Density ($Kg/m^3$) | | | |
|---|---|---|---|---|
| Powder | As Spray-Dried | After Air-Lift | Increase | % Increase |
| E | 266 | 319 | 53 | 19.9 |
| F | 275 | 307 | 32 | 11.6 |

It can be seen that the inclusion of starch by the process of the invention has a marked effect in reducing friability of the powder.

What is claimed is:

1. A process for the production of a spray-dried detergent powder comprising the steps of:

(a) forming an aqueous crutcher slurry comprising (i) from 10–35% by weight, based on the weight of the spray-dried powder, of a detergent active compound;

(ii) a detergency builder compound in an amount of from 10–35% by weight, based on the weight of the spray dried powder, provided that when a phosphate-containing detergency builder is present it is present in an amount of from 10–20% by weight, based on the weight of the spray-dried powder;

(iii) at least 5% by weight, based on the weight of the spray dried powder, of a sodium silicate; and (iv) a hydrated starch in an amount of from about 1 to 5% by weight, based on the weight of the spray dried powder;

and (b) spray drying the slurry to a spray dried powder.

2. A process for the production of a spray dried detergent powder according to claim 1, in which the hydrated starch is formed by pre-dispensing starch in a solution of sodium silicate.

* * * * *